United States Patent
Bohn (10) Patent No.: US 8,982,542 B2
(45) Date of Patent: Mar. 17, 2015

(54) HINGE MECHANISM FOR MOBILE ELECTRONIC DEVICE

(75) Inventor: David Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 622 days.

(21) Appl. No.: 12/948,573

(22) Filed: Nov. 17, 2010

(65) Prior Publication Data

US 2012/0120618 A1     May 17, 2012

(51) Int. Cl.
| | |
|---|---|
| *H05K 7/00* | (2006.01) |
| *H04M 1/02* | (2006.01) |
| *G06F 1/16* | (2006.01) |
| *H04M 1/00* | (2006.01) |
| *E05D 3/12* | (2006.01) |
| *E05D 3/18* | (2006.01) |
| *E05F 1/12* | (2006.01) |

(52) U.S. Cl.
CPC .............. *H04M 1/022* (2013.01); *G06F 1/1618* (2013.01); *G06F 1/1681* (2013.01); *E05D 3/12* (2013.01); *E05D 3/18* (2013.01); *E05F 1/1253* (2013.01); *E05Y 2201/638* (2013.01); *E05Y 2900/606* (2013.01)
USPC .............. 361/679.06; 361/679.28; 361/679.3; 455/575.1; 455/575.3

(58) Field of Classification Search
CPC ............... H04M 1/00; G06F 1/16; E05F 1/08
USPC .............. 361/679.06–679.07, 679.26–679.3; 455/575.3, 575.1; 16/366, 368, 369, 16/370, 287, 288
See application file for complete search history.

(56) References Cited

U.S. PATENT DOCUMENTS

| | | | |
|---|---|---|---|
| 6,484,016 B1 | 11/2002 | Cheon | |
| 6,798,649 B1 * | 9/2004 | Olodort et al. | ........... 361/679.13 |
| 7,117,562 B2 * | 10/2006 | Zuo et al. | ........................ 16/303 |
| 7,155,266 B2 * | 12/2006 | Stefansen | ................... 455/575.3 |
| 7,232,313 B1 | 6/2007 | Shinoda | |
| 7,489,778 B2 | 2/2009 | Lee | |
| 7,779,509 B2 | 8/2010 | Jian | |

(Continued)

FOREIGN PATENT DOCUMENTS

| | | |
|---|---|---|
| CN | 101150938 A | 3/2008 |
| EP | 2112311 A1 | 10/2009 |

OTHER PUBLICATIONS http://images.pcworld.com/reviews/graphics/products/imported/31044_g3.jpg, Nokia E90 Communicator, downloaded Sep. 13, 2010, 1 page.

(Continued)

*Primary Examiner* — Zachary M Pape
*Assistant Examiner* — Douglas Burtner
(74) *Attorney, Agent, or Firm* — Judy Yee; Micky Minhas (57) ABSTRACT

A hinge mechanism for a mobile electronic device includes a first leaf comprising first and second fixed pivot axes and a second leaf comprising third and fourth fixed pivot axes, the four pivot axes being substantially parallel to one another. A first linkage is pivotally coupled to the first leaf at the first pivot axis and pivotally coupled to the second leaf at the fourth pivot axis. A second linkage is pivotally coupled to the first leaf such at the second pivot axis and pivotally coupled to the second leaf at the third pivot axis. The first and second leaves are pivotable at least about 180° relative to one another. A cam mechanism can be included to bias the pivotal motion of the leaves. An FPC or other electrical connector linking the leaves can pass through a passage in at least one of the linkages.

11 Claims, 10 Drawing Sheets

(56) References Cited

U.S. PATENT DOCUMENTS

| | | |
|---|---|---|
| 2005/0225393 A1 | 10/2005 | Lee et al. |
| 2007/0019378 A1 | 1/2007 | Kwon |
| 2007/0072658 A1 | 3/2007 | Cheng |
| 2008/0074858 A1* | 3/2008 | Hori et al. .............. 361/825 |
| 2009/0049646 A1 | 2/2009 | Rubin et al. |

OTHER PUBLICATIONS http://www.nvtools.co.uk/images/main/main_soss.jpg, SOSS Hinge, downloaded Sep. 13, 2010, 1 page.

http://machinedesign.com/article/sleek-designs-hinge-on-strong-rotary-joints-1104, Machinedesign.com, downloaded Sep. 13, 2010, 5 pages.

Talocia et al., "Signal Integrity constrained optimization of flexible printed interconnects for mobile devices," *IEEE*, 3:636-641, Aug. 14-18, 2006.

Office Action (with an English translation) for related Chinese Patent Application No. 201110382425.X, 18 pages, dated Dec. 5, 2013.

Office Action (with an English translation) for related Chinese Patent Application No. 201110382425.X, 6 pages, dated Jul. 15, 2014.

* cited by examiner

HINGE MECHANISM FOR MOBILE ELECTRONIC DEVICE

FIELD

This disclosure relates to hinge mechanisms for mobile electronic devices, such as mobile phones and mobile computers.

BACKGROUND

Conventional hinged mobile electronic devices, such as conventional "flip phones," typically include two body portions, or leaves, hinged about a single pivot axis. In the closed position, this single pivot axis is positioned even with the plane of contact between the two leaves. Because of this geometry, the two leaves cannot open 180° and/or the hinge protrudes upward out of plane with the leaf faces.

Other hinged mobile electronic devices include two pivot axes, one fixed relative to each leaf, with a single linkage connecting the leaves via the two pivot axes. This setup, however, can lead to indeterminate motion between the leaves as the two leaves are free to pivot independently relative to the linkage.

Still other mobile electronic devices include one or more sliding pivot axes that are not fixed relative to a leaf. These devices can be overly complicated and can also exhibit indeterminate motion between the two leaves.

SUMMARY

Disclosed herein are embodiments of multi-axis hinge mechanisms for mobile electronic devices that allow for at least 180° determinate pivoting motion between two portions of the device.

In some exemplary embodiments, a hinge mechanism for a mobile electronic device includes a first leaf comprising first and second fixed pivot axes and a second leaf comprising third and fourth fixed pivot axes, the four pivot axes being substantially parallel to one another. A first linkage is pivotally coupled to the first leaf at the first pivot axis and pivotally coupled to the second leaf at the fourth pivot axis. A second linkage is pivotally coupled to the first leaf such at the second pivot axis and pivotally coupled to the second leaf at the third pivot axis. The first and second leaves are pivotable at least about 180° relative to one another in a plane substantially perpendicular to the pivot axes. Some of these embodiments can further comprise a second set of linkages similar to and spaced apart from the first and second linkages.

In some embodiments, when the hinge is in the closed position, the first linkage and the second linkage are transverse to one another when viewed in an axial direction of the first, second, third and fourth pivot axes.

In some embodiments, the absolute value of the first link length minus the second link length is greater than or equal to the absolute value of the first separation between the two axes of the first leaf minus the second separation between the two axes of the second leaf.

In some embodiments, a distance between the first and second pivot axes is about equal to a distance between the third and fourth pivot axes and a distance between the first and fourth pivot axes is about equal to a distance between the second and third pivot axes.

In some embodiments, when the first and second leaves are in the closed position, a distance between the first and third pivot axes is about equal to a distance between the second and fourth pivot axes.

In some embodiments, only substantially determinate motion is permitted as the first and second leaves pivot between the closed position and the open position.

In some embodiments, as the first and second leaves moves from the closed position to the open position, the first linkage pivots less than 90° about the first pivot axis relative to the first leaf and the second linkage pivots more than 90° about the second pivot axis relative to the first leaf.

In some embodiments, the first leaf comprises an outer major surface and an inner major surface, the second leaf comprises an outer major surface and an inner major surface, the inner major surfaces of the first and second leaves are substantially coplanar when the first and second leaves are in the open position, the outer major surfaces of the first and second leaves are substantially coplanar when the first and second leaves are in the open position, and the first and second pivot axes are about halfway between the inner and outer major surfaces of the first leaf and the third and fourth pivot axes are about halfway between the inner and outer major surfaces of the second leaf.

In some embodiments, the first leaf and the second leaf are pivotable, between a first closed position and a second closed position, about 360° relative to one another in a plane substantially perpendicular to the first, second, third and fourth pivot axes. In some of these embodiments, when the first and second leaves are in the first closed position or in the second closed position, the first, second, third and fourth pivot axes are substantially coplanar.

In some embodiments, one or more cam mechanisms can be included to bias the pivotal motion of the leaves relative to one another, such as toward a closed or open position. The cam mechanism can include a radial bistable over-center cam, a radial friction detent cam, an axial bistable over-center cam, and/or an axial friction detent cam. In some embodiments, the hinge mechanism can also include a spring having a first end portion and a second end portion, the first end portion being engaged with the first leaf, and a pusher comprising a first end portion and a second end portion, the first end portion of the pusher being engaged with the second end portion of the spring and slidable relative to the first leaf, wherein one of the first and second linkages comprises a cam portion adjacent to the first leaf, the cam portion interacting with the second end portion of the pusher to bias hinge toward the closed position or toward the open position.

In some embodiments, one or more of the linkages can also include a longitudinal passageway through which a flexible printed circuit (FPC) and/or other flexible electrical connectors linking the two leaves can be routed. Linkages comprising such a passageway can have a wider intermediate portion than other linkages not comprising such a passageway.

In some embodiments, the first linkage and the second linkage can be nested with one another. In some embodiments, each leaf can comprise a frame-like chassis component that structurally supports the linkages, couples the linkages to the leaves and/or helps route the FPC and/or other electrical connector between the leaves.

Some embodiments of a hinged mobile electronic device include a first leaf comprising a first pivot axis and a second pivot axis, the first and second pivot axes being spaced from one another and fixed relative to the first leaf; a second leaf comprising a third pivot axis and a fourth pivot axis, the third and fourth pivot axes being spaced from one another and fixed relative to the second leaf, the first, second, third and fourth pivot axes being substantially parallel to one another; a first linkage pivotally coupled to the first leaf such that the first linkage is pivotable about the first pivot axis relative to the first leaf, and pivotally coupled to the second leaf such that the first linkage is pivotable about the fourth pivot axis relative to the second leaf; and a second linkage pivotally coupled to the first leaf such that the second linkage is pivotable about the second pivot axis relative to the first leaf, and pivotally coupled to the second leaf such that the second linkage is pivotable about the third pivot axis relative to the second leaf; wherein at least one of the first leaf and the second leaf comprises electronic user interface apparatus, and wherein the first leaf and the second leaf are pivotable, between a closed position and an open position, at least about 180° relative to one another in a plane substantially perpendicular to the first, second, third and fourth pivot axes.

In some of these embodiments, the second linkage comprises a longitudinal passage extending from adjacent the second pivot axis to adjacent the third pivot axis, the mobile device further comprising a flexible printed circuit (FPC) extending between the first leaf and the second leaf, the FPC passing through the longitudinal passage in the second linkage.

In some of these embodiments, the hinged mobile electronic device also includes a first side surface and an opposed second side surface, the first and second side surfaces being substantially perpendicular to the first pivot axis, the first and second linkages being nearer to the first side surface that to the second side surface; the hinged mobile electronic device further includes a third linkage pivotally coupled to the first leaf and to the second leaf, the third linkage being nearer to the second side surface than to the first side surface, the thirst linkage comprising a longitudinal passage extending from adjacent the first leaf to adjacent the second leaf; and the hinged mobile electronic device further includes a coaxial cable extending between the first leaf and the second leaf, the coaxial cable passing through the longitudinal passage in the third linkage.

In some of these embodiments, the first leaf comprises a first major surface and an opposed second major surface, the second leaf comprises third major surface and an opposed fourth major surface, and the first, second, third and fourth major surfaces each comprise an electronic display screen.

One exemplary embodiment of a hinged mobile electronic device comprises a first leaf comprising a first pivot axis and a second pivot axis, the first and second pivot axes being spaced from one another and fixed relative to the first leaf. The hinged mobile electronic device also comprises a second leaf comprising a third pivot axis and a fourth pivot axis, the third and fourth pivot axes being spaced from one another and fixed relative to the second leaf, the first, second, third and fourth pivot axes being substantially parallel to one another. The hinged mobile electronic device also comprises a first linkage pivotally coupled to the first leaf such that the first linkage is pivotable about the first pivot axis relative to the first leaf, and pivotally coupled to the second leaf such that the first linkage is pivotable about the fourth pivot axis relative to the second leaf. The hinged mobile electronic device also comprises a second linkage pivotally coupled to the first leaf such that the second linkage is pivotable about the second pivot axis relative to the first leaf, and pivotally coupled to the second leaf such that the second linkage is pivotable about the third pivot axis relative to the second leaf, the second linkage comprising a longitudinal passage extending from adjacent the second pivot axis to adjacent the third pivot axis, the first and second linkages being nested with one another. The hinged mobile electronic device also comprises a third linkage pivotally coupled to the first leaf such that the third linkage is pivotable about the first pivot axis relative to the first leaf, and pivotally coupled to the second leaf such that the third linkage is pivotable about the fourth pivot axis relative to the second leaf, the third linkage comprising a longitudinal passage extending from adjacent the second pivot axis to adjacent the third pivot axis. The hinged mobile electronic device also comprises a fourth linkage pivotally coupled to the first leaf such that the fourth linkage is pivotable about the second pivot axis relative to the first leaf, and pivotally coupled to the second leaf such that the fourth linkage is pivotable about the third pivot axis relative to the second leaf, the third and fourth linkages being nested with one another and spaced apart from the first and second linkages. The hinged mobile electronic device also comprises at least one cam mechanism for biasing the pivotal movement of first and second leaves relative to one another. The hinged mobile electronic device also comprises a flexible printed circuit (FPC) extending between the first leaf and the second leaf, the FPC passing through the longitudinal passage in the second linkage and electrically connecting components of the first and the second leaves. The hinged mobile electronic device also comprises an electrical connector extending between the first leaf and the second leaf, the electrical connector passing through the longitudinal passage in the third linkage and electrically connecting components of the first and the second leaves. The first leaf and the second leaf are pivotable, between a closed position and an open position, at least about 180° relative to one another in a plane substantially perpendicular to the first, second, third and fourth pivot axes, and when the device is in the closed position, the first linkage and the second linkage are transverse to one another and the third and fourth linkages are transverse to one another when viewed in an axial direction of the first, second, third and fourth pivot axes.

The disclosure herein references a number of exemplary embodiments. The inventive features include all novel and non-obvious elements disclosed herein both alone and in novel and non-obvious sub-combinations with other elements. In this disclosure, it is to be understood that the terms "a", "an" and "at least one" encompass one or more of the specified elements. That is, if two of a particular element are present, one of these elements is also present and thus "an" element is present. The phrase "and/or" means "and", "or" and both "and" and "or".

DETAILED DESCRIPTION

Figure 1:
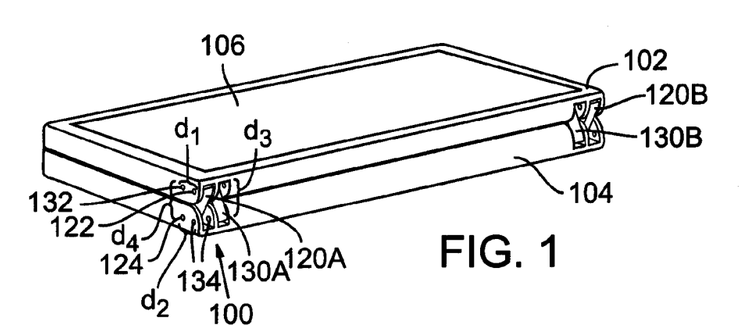
FIG. 1 is a perspective view of an exemplary hinge mechanism having two leaves hinged together via four linkages, as configured for a hinged mobile electronic device.

FIG. 1 shows an embodiment of a hinged mobile electronic device comprising a first leaf 102 and a second leaf 104 coupled together with a multi-axis hinge mechanism 100. As used herein, the term "leaf" refers to a body portion of a hinge that is pivotable relative to another body portion of the hinge. The mobile electronic device can be, for example, a hand-held device, such as a smart phone, or a portable computer, such as a lap-top.

The hinged mobile electronic device can comprise a plurality of user interface screens on the major surfaces of each leaf. For example, screen 106 is shown positioned on an outer major surface of leaf 102. The screens can be used for user input and/or display purposes. The screen can also be replaced with a plurality of smaller screens and/or other user interface mechanisms, such as a keyboard. Exemplary embodiments of the hinged device can comprise such user interface mechanisms on any surfaces and on any combination of surfaces as desired.

FIG. 1 shows the device in a folded position, or closed position, with the first leaf 102 and the second leaf 104 positioned adjacent and/or contacting one another.

Figure 2:
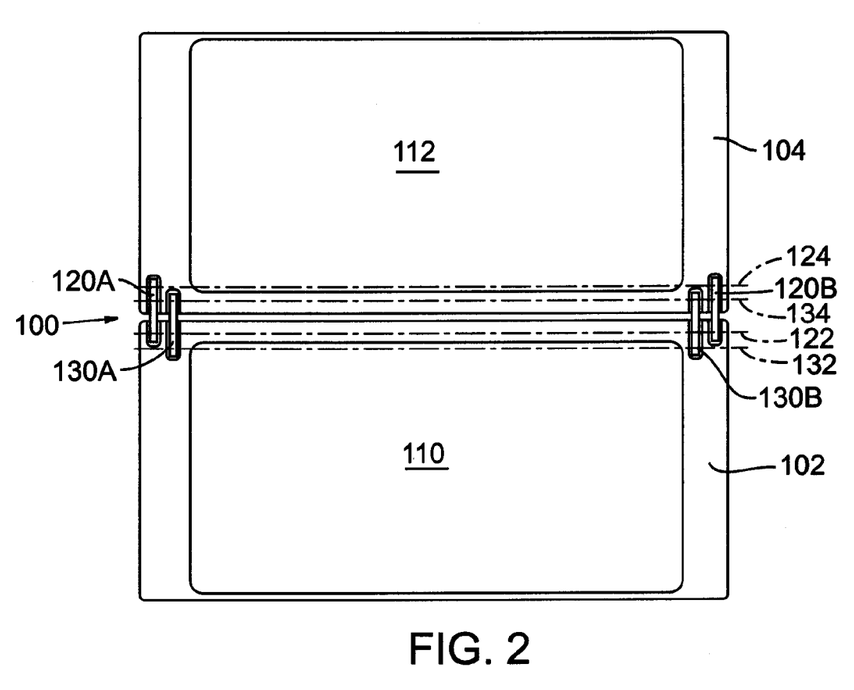
FIG. 2 is a plan view of the device of FIG. 1 in an open position.

FIG. 2 shows the device in an open position, wherein, compared to FIG. 1, the leaf 102 has been pivoted open 180° relative to the leaf 104, exposing the inner major surfaces of each leaf. Screen 112 is shown in the inner major surface of leaf 104 and screen 110 is shown in the inner major surface of leaf 102.

The hinge mechanism 100 comprises at least two linkages coupling the first leaf 102 and the second leaf 104. FIGS. 1 and 2 show a device with two pairs of such linkages. The left-hand pair comprises an outer first linkage 120A and an inner second linkage 130A, while the right-hand pair comprises an outer third linkage 120B and an inner fourth linkage 130B.

The device also comprises four parallel pivot axes about which the leaves pivot relative to the linkages. FIGS. 1 and 2 show a first pivot axis 122, a second pivot axis 124, a third pivot axis 132 and a fourth pivot axis 134. The first and third axes 122, 132 pass through the first leaf 102 and are fixed relative to the first leaf. The second and fourth axes 124, 134 pass through the second leaf 104 and are fixed relative to the second leaf.

The first linkages 120A, 120B are pivotally coupled to the first leaf 102 at the first pivot axis 122 such that the first linkages are pivotable about the first pivot axis relative to the first leaf, and pivotally coupled to the second leaf 104 at the second pivot axis 124 such that the first linkages are pivotable about the second pivot axis relative to the second leaf. Similarly, the second linkages 130A, 130B are pivotally coupled to the first leaf 102 at the third pivot axis 132 such that the second linkages are pivotable about the third pivot axis relative to the first leaf 102, and the pivotally coupled to the second leaf 104 at the fourth pivot axis 134 such that the second linkages are pivotable about the fourth pivot axis relative to the second leaf. This, fixed-axis, dual-linkage configuration can restrict the relative freedom of movement between the leaves such that, with one leaf held stationary, the other leaf can only move back and forth along a single, predetermined path, such as is the case with two leaves that are directly connected about only a single pivot axis, like a traditional flip phone. Such restricted motion is defined herein as "determinate" motion.

In some embodiments, the device can comprise only a single first linkage 120 and/or a single second linkage 130. In other embodiments, the device can comprise three or more of one or both of the first and second linkages. The term "the first linkage 120" is hereinafter used to refer to the first linkages 120A and 120B, both collectively and individually. Similarly, the term "the second linkage 130" is hereinafter used to refer to the second linkages 130A and 130B, both collectively and individually. Similar nomenclature is also used in reference to the other embodiments described herein.

Figures 3A, 3B:
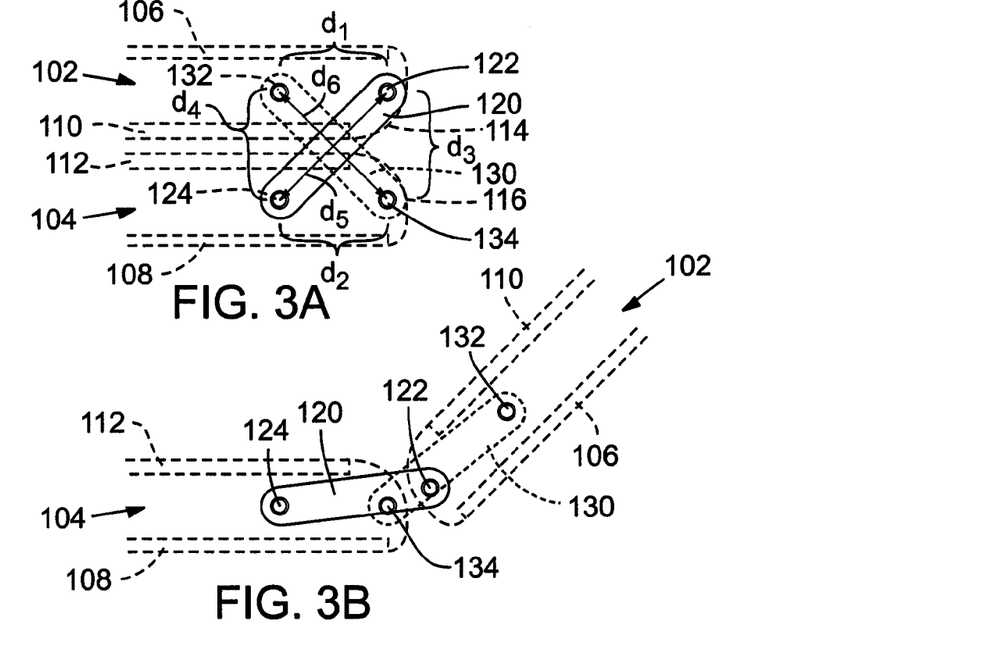
FIGS. 3A-3D illustrate the motion of another exemplary hinge mechanism between closed and open positions.

As shown in FIG. 3A, in some embodiments, the four pivot axes can be equally spaced from one another in a square pattern when in the closed position. In these embodiments, the distance from the first axis 122 to the third axis 132 ($d_1$), the distance from the fourth axis 134 to the second axis 124 ($d_2$), the distance from the first axis 122 to the fourth axis 134 ($d_3$), and the distance from the third axis 132 to the second axis 124 ($d_4$) are all equal when in the closed position. The distance $d_1$ can be referred to the first separation and the distance $d_2$ can be referred to as the second separation. With this axis pattern, the linkages 120, 130 bisect one another at a perpendicular angle when viewed in the direction of the axes (see, e.g., FIG. 3A). Also, in this pattern, the "link length" of the first linkage 120, which is defined as the distance between the first axis 122 and the second axis 124 ($d_5$), can be equal to the "link length" of the second linkage, which is defined as the distance between the third axis 132 and the fourth axis 134 ($d_6$).

Figures 5A, 5B:
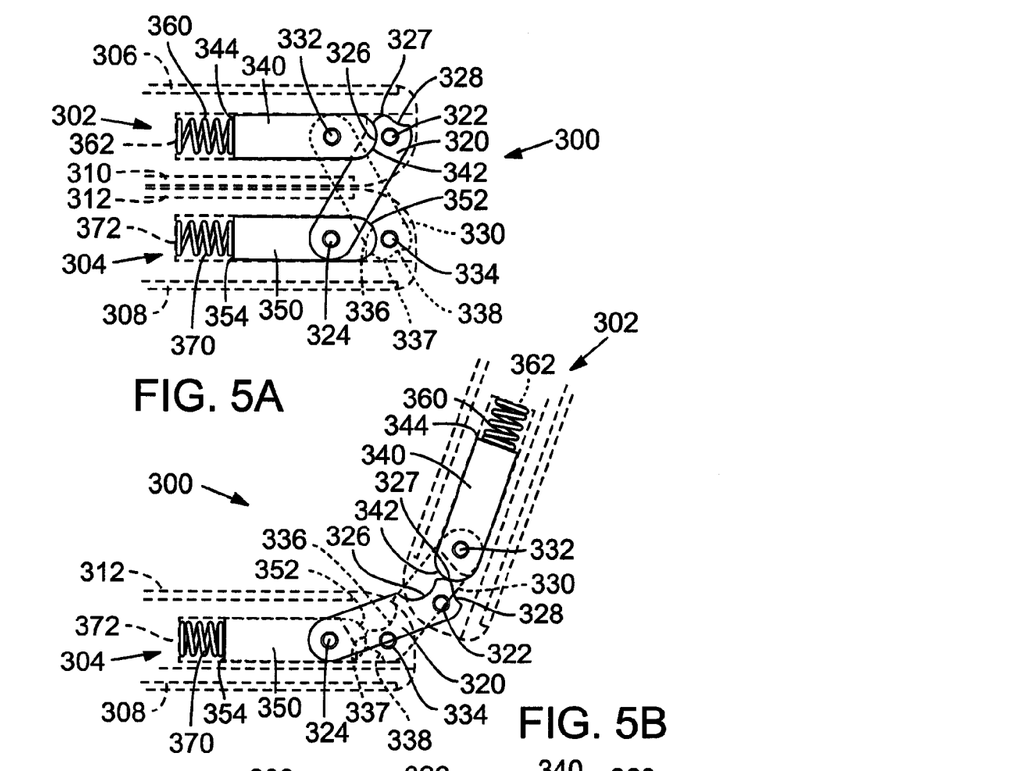
FIGS. 5A-5D illustrate the motion of yet another exemplary hinge mechanism having a cam mechanism for biasing the motion toward open and closed positions.

In other embodiments, such as those shown in FIGS. 1 and 5A, the four pivot axes can form a rectangle pattern when in the closed position. In FIG. 1, for example, which is shown in a closed position, the distances $d_1$ is still equal to the distance $d_2$, the distance $d_3$ is still equal to the distance $d_4$, and the linkage lengths $d_5$ and $d_6$ are still equal. However, the distances $d_1$ and $d_2$ are less than the distances $d_3$ and $d_4$.

In still other embodiments not shown, the four pivot axes can form non-rectangular patterns when in the closed position, while still allowing for a determinate 180° pivoting motion between the leaves. In one example, in order to achieve at least 180° pivoting, when in the closed position, a line connecting the first axis 122 and the second axis 124 must intersect a line connecting the third axis 132 and the fourth axis 134, when projected onto a plane perpendicular to the four axes, as is shown in FIGS. 3A and 5A (i.e., the linkages must be transverse to one another or crossed). In another example, the absolute value of $d_5$ minus $d_6$ (i.e., the difference between the longest linkage and the shortest linkage) must be greater than or equal to the absolute value of $d_3$ minus $d_4$ (i.e., the difference between the spacing of the axes in each leaf), in order to achieve 180° pivoting.

Figure 3C:
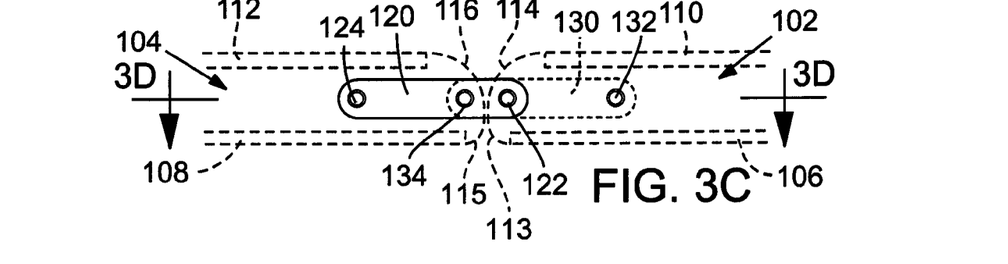

In some embodiments, the pivot axes can be positioned half way between the two major surfaces of leaves. For example, as shown in FIGS. 3A-3C, the first and third axes 122, 132 are approximately centered half way between the inner and outer major surfaces of the first leaf 102 and the second and fourth axes 124, 134 are centered half way between the inner and outer major surfaces of the second leaf 104. In this embodiment, the axes can be centered with respect to the leaves and, when in the open position, as shown in FIG. 3C, the screens 110 and 112 on the inner major surfaces can be coplanar, or flush, with one another and the outer major surfaces, with or without the screens 106 and 108, can also be coplanar with one another. The centering of the axes in the leaves can also help to fit the linkages structurally within the frame of each leaf and increases the available width for the linkages.

FIGS. 3A-3C show the motion of the first leaf 102 relative the second leaf 104 as the first leaf pivots and translates from a closed position in FIG. 3A to an open position in FIG. 3C. The motion is reversed to close the device. During the opening motion, the first linkage 120 pivots less than 90° relative to the second leaf 104, while the second linkage 130 pivots more than 90° relative to the second leaf 104. In the embodiment shown in the sequence of FIG. 3A to FIG. 3C, wherein the pivot axes are equally spaced and for a square pattern, the first linkage 120 pivots about 45° relative to the second leaf 104, while the second linkage pivots about 135° relative to the second leaf 104.

In the closed position, the first and second linkages 120, 130 can be transverse and/or skewed to one another when viewed in the direction of the pivot axes. As used herein, the term "transverse" means that a first line $d_5$ connecting the two pivot axes 122, 124 of a the first linkage 120 and a second line $d_6$ connecting the two pivot axes 132, 134 of the second linkage 130 form a crossing or intersecting pattern. In the particular embodiment shown in FIG. 3A, the linkages are perpendicular to one another due to the symmetry of the pivot axes.

In the open position, the first and second linkages 120, 130 can be parallel with one another, when viewed in the direction of the pivot axes. In the embodiment shown in FIG. 3C, the linkages are parallel and aligned with one another and the four pivot axes are coplanar.

Importantly, between the closed position and the open position, the first leaf 102 can move only in a single, determinate path relative to the second leaf 104. In other words, the geometry of the linkages and the pivot axes limit the leaves to moving in a same manner relative to one another each time the leaves are opened and closed. This is a feature present in conventional single-axis flip phones, but not present in conventional two-axis devices having a single linkage. In the latter case, the allowable motion can include indeterminate motion.

Figure 3D:
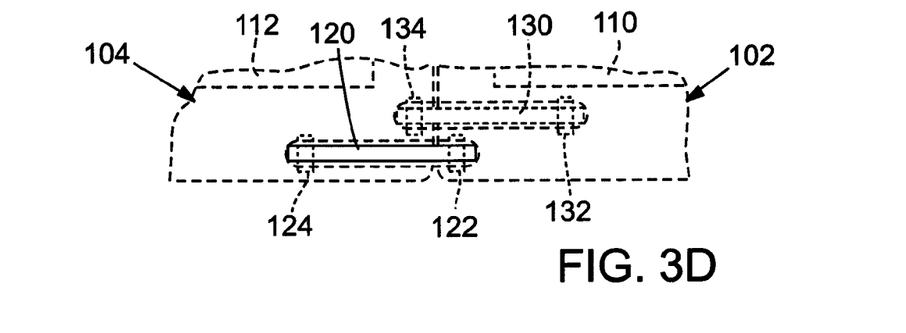

FIG. 3D is a cross-sectional view of FIG. 3C, showing an exemplary spacing and layout of the first linkage 120 relative to the second linkage 130. In this embodiment, the linkages 120, 130 are staggered and spaced relative to one another and do not directly contact one another.

As shown in FIG. 3A, the leaves 102, 104 can be spaced from one another in the closed position. This spacing can help reduce damage to the screens 110 and 112 on the inner major surfaces of the leaves. The spacing can also provide a clearance between the leaves as the device pivots open and closed. In addition to the spacing between the leaves, the facing edges 114 and 116 of the leaves can be rounded to help provide a clearance between the leaves as the leaves pivot open and closed. As shown in FIG. 3B, rounded edges 114, 116 allow the first leaf 102 to pass by the second leaf 104 during the intermediate portion of the opening/closing motion. In embodiments without the edge rounding at 114, 116, the two leaves need to be spaced farther apart in the closed position. With the edge rounding at 114 and 116, it is desirable that the spacing between the leaves remains similar throughout the motion or decreases as the leaves pivot open. The rounding of the edges 114, 116 can also affect the space available for the screens 110 and 114. Less rounding can result in more available screen space.

In some embodiments, the leaves 102, 104 can pivot a full 360° from a first closed position, past an open position, and to a second closed position. In the example shown in FIG. 3C, for example, if edges 113 and 115 are more rounded, the first leaf 102 can continue swinging clockwise relative to the second leaf 104 until the major surface at screen 106 becomes parallel with and adjacent to the surface at screen 108. There can be other physical limitations, however, that limit the motion to that shown in FIGS. 3A-3C. For example, as shown in FIG. 1, the linkages 120, 130 are restricted from rotating past the position of FIG. 3C by structural portions of the leaves.

FIGS. 4A-4D show another embodiment of a hinged device wherein a first leaf 202 can pivot 360° relative to a second leaf 204. In a first closed position shown in FIG. 4A, screens 210 and 212 are adjacent to one another, while in a second closed position shown in FIG. 4D, screens 206 and 208 are adjacent to one another. In addition to pivoting, the two leaves also translate relative to one another as they move between the two closed positions.

A first linkage 220 is pivotally coupled to the first leaf 202 at pivot axis 222 and pivotally coupled to the second leaf 204 at pivot axis 224. A second linkage 230 is pivotally coupled to the first leaf 202 at pivot axis 232 and pivotally coupled to the second leaf at pivot axis 234.

Figures 4A, 4B:
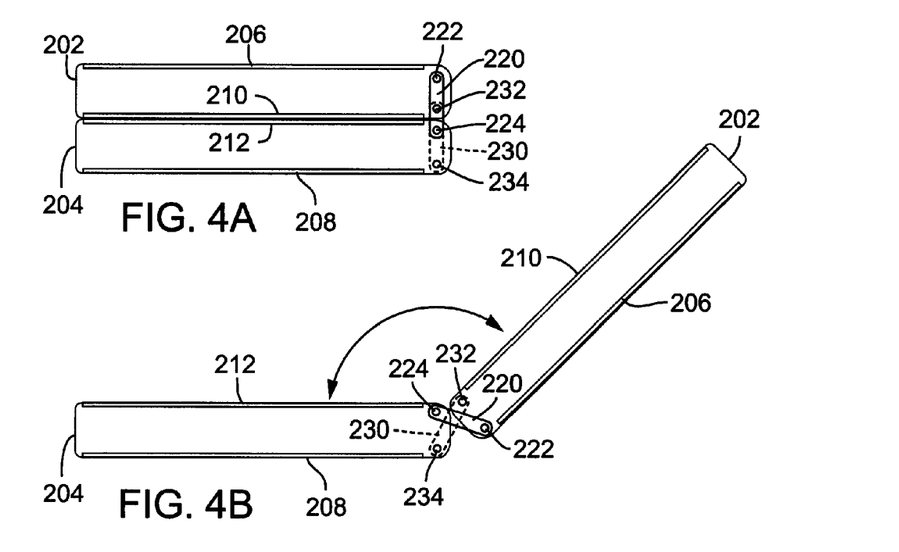
FIGS. 4A-4D illustrate the motion of another exemplary hinge mechanism between first and second closed positions.
Figure 4C:
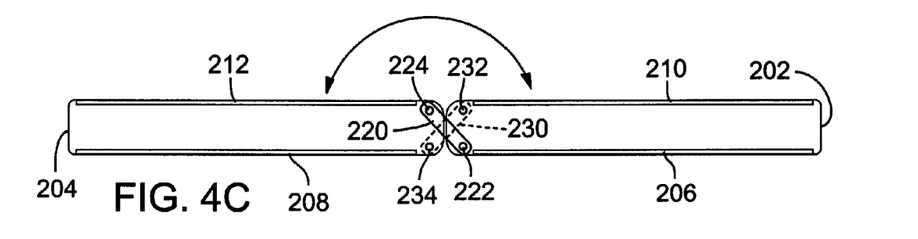
Figure 4D:
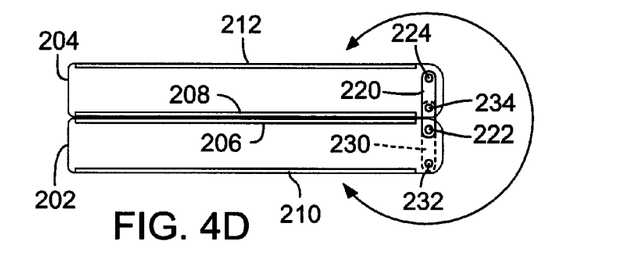

As shown in FIGS. 4A and 4D, in the closed positions, the first and second linkages 220, 230 are aligned and the four pivot axes are parallel. While the leaves translate and pivot 360° relative to one another between the two closed positions, the linkages only pivot 180° relative to each leaf.

As shown in FIG. 4C, in the open position, the first and second linkages 220, 230 are transverse to one another while the screens 210 and 212 are aligned side-by-side and the screens 206 and 208 are also aligned side-by-side.

In some embodiments, one or more of the screens 206, 208, 210, 212 can be omitted, changed in size and/or replaced with alternative interfaces. For example, in some embodiments, screens 206 and 208 can be removed such that in the first closed position, the two remaining screens are protected. This can be a desirable position for storing the device in a pocket, for example. Then, when the device is in the second open position, each of the remaining screens can be position on the exposed surfaces of the device for user interaction. It should be appreciated that many other screen configurations are similarly possible with the device shown in FIGS. 4A-4D.

It is desirable in many embodiments to include a mechanism that biases the pivotal motion of the two leaves relative to one another, such as toward a closed position or toward an open position and/or provides resistance to the pivotal motions of the two leaves, such as with one or more high friction joints.

FIGS. 5A-5D illustrate an embodiment of a hinged mechanism 300 of a mobile device having a cam mechanism for biasing the motion of the two leaves relative to one another. A first leaf 302 and a second leaf 304 are pivotally coupled by a first linkage 320 at pivot axes 322 and 324 and by a second linkage 330 at pivot axes 332 and 334. In one embodiment, each leaf is about 6.8 mm thick. The first leaf 302 can comprise screens 306 and 310 and the second leaf 304 can comprises screens 308 and 312. One or both of the first and second linkages 320, 330 can comprise a cam portion around the pivot axes. The cam portions can include one or more concave portions separated by raised portions to form a cam. For example, linkage 320 comprises a cam portion around axis 322 that includes a first detent 326 and a second detent 328 separated by a raised portion 327. Similarly, linkage 330 comprises a cam portion around axis 334 that includes a first detent 336 and a second detent 338 separated by a raised portion 337.

The cam portions of the linkages can interact with push rods, or pushers, springs and/or other biasing members to bias the relative motion of the leaves. For example, the embodiments of FIGS. 5A-5D include a first pusher 340 and a first spring 360 that interact with the cam portion of the first linkage 320 and the first leaf 302, and a second pusher 350 and a second spring 370 that interact with the cam portion of the second linkage 330 and the second leaf 304. The first pusher 340 comprises a convex first end 342 that interacts with the detents 326, 328 and raised portion 327 of the first linkage 320 and a second end 344 that interacts with the first spring 360. The opposite end 362 of the first spring 360 abuts, or is fixed to, the first leaf 302. Similarly, the second pushers 350 comprises a convex first end 352 that interacts with the detents 336, 338 and raised portion 337 of the second linkage 330 and a second end 354 that interacts with the second spring 370. The opposite end 372 of the second spring 370 abuts, or is fixed to, the second leaf 304.

As the devices moves from the closed position shown in FIG. 5A to the intermediate position shown in FIG. 5B, the convex first ends 342, 352 of the pushers move out of the first detents 326, 336 into contact with the raised portions 327, 337. Because the axes 322, 334 are fixed with the leaves, this forces the pushers 340, 350 to slide away from the axes 322, 334 and towards the springs 360, 370, thereby compressing the springs, as shown in FIG. 5B.

Figure 5C:
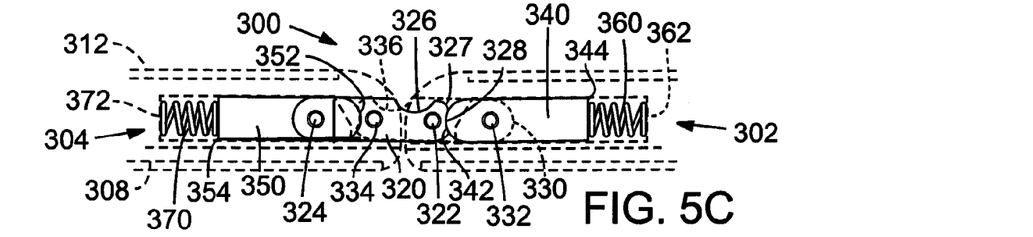

As the device moves from the intermediate position of FIG. 5B to the open position of FIG. 5C, the convex first ends 342, 352 of the pushers move off of the raised portions 327, 337 and into the second detents 328, 338. Because the axes 322, 334 are fixed with the leaves, this allows the pushers 340, 350 to slide back toward the axes 322, 334 as the compressed springs 360, 370 expand, as shown in FIG. 5C.

It should be noted that some embodiments of the hinged device can comprise only a single cam mechanism between one linkage and one leaf. A single cam and spring can be sufficient to bias the pivotal motion of the leaves. Because the linkages and the leaves are confined to move in unison with one another in a determinate motion, biasing the motion between any linkage and any leaf can be sufficient to bias the motion of the whole hinge.

Although not shown, some embodiments of a hinged mobile device can comprise one or more friction joints. For example, a pivot pin fixed relative to one of the leaves can be tightly fitted within an aperture in one of the linkages at a pivot axis such that the tight fit provides sufficient frictional resistance to hold the two leaves in a desired position relative to one another until a user manually overcomes the resistance to further open or close the device. In another example, one or more washers positioned on a pivot pin adjacent to the linkages can create a clutch-like friction joint as two washers, or a washer and a surface of the linkage or the leaf, rub against each other in a rotational motion when the device is opened or closed. Yet another example comprises a so-called "question mark" friction joint wherein a piece of sheet metal, for example, is tightly wrapped around a pivot pin to create a friction surface. These types of friction joints can be used instead of or in combination with cam-type biasing mechanisms.

Figure 9:
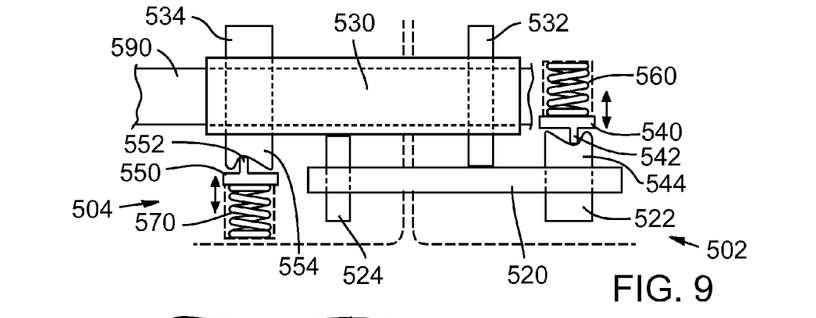
FIG. 9 is a plan view of another exemplary hinge mechanism, shown in an open position, having two linkages with axial cam mechanisms.

In other embodiments, other motion biasing or motion resistance mechanisms can be employed to control the pivotal motion of the leaves relative to one another. Combinations of various types of cam mechanisms and friction hinge mechanism can be employed, such as radial bistable over-center cams, axial bistable over-center cams, radial friction detent cams, and axial friction detent cams, for examples. An example of an axial cam mechanism is shown in FIG. 9. It should be appreciated that many other known biasing mechanisms other than cam mechanisms, such as magnet mechanisms and other spring mechanisms, could also be suitably employed for biasing the pivotal motion of the leaves. It should also be appreciated that the 360° embodiment shown in FIGS. 4A-4D can also comprise biasing mechanisms.

Figure 6A:
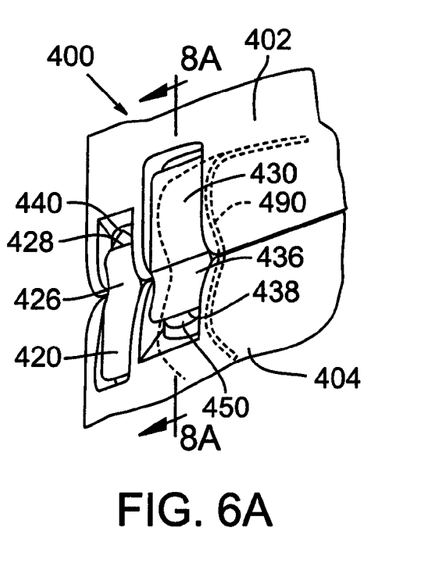
FIG. 6A is a perspective view of a portion of an exemplary hinged mobile electronic device, in an open position, showing two linkages with radial cam mechanisms.
Figure 6B:
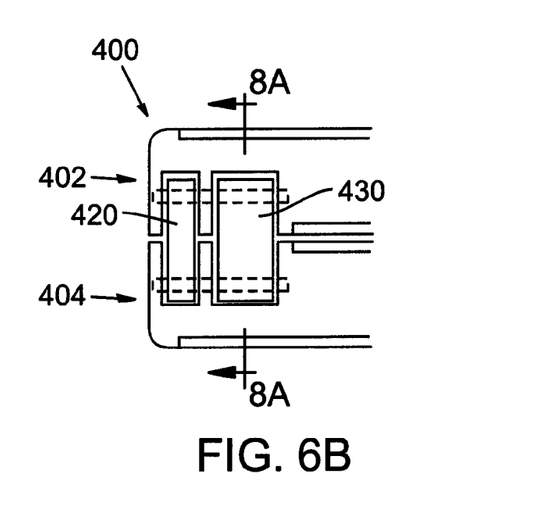
FIG. 6B is a side view of the hinged mobile electronic device of FIG. 6A in a closed position.
Figure 7:
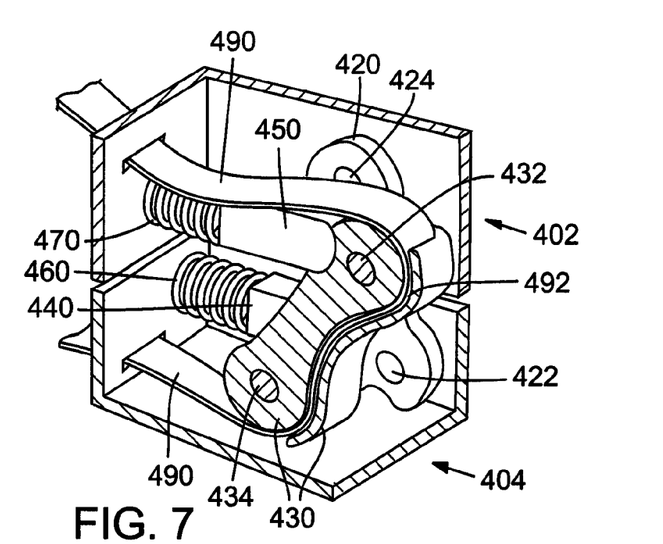
FIG. 7 is a perspective view of the two linkages of FIG. 6A, when the mobile electronic device is in the closed position, showing an FPC routed through one of the linkages.
Figure 8A:
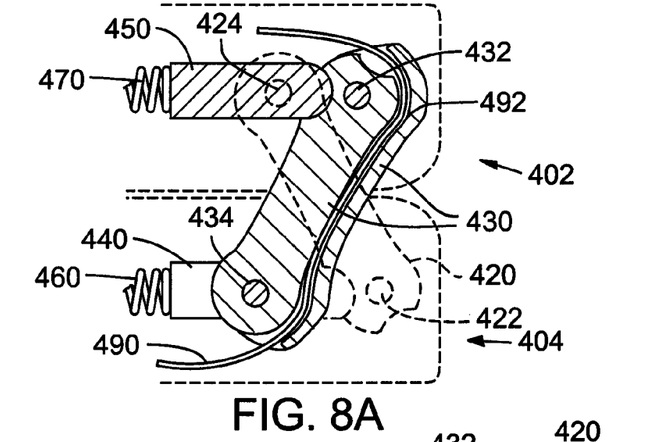
FIGS. 8A and 8B are cross-sectional views of the mobile device shown in FIGS. 6A and 6B.
Figure 8B:
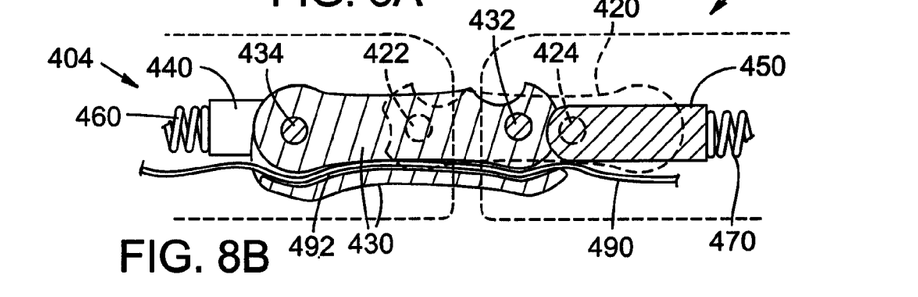

FIGS. 6-8 illustrate another embodiment of a hinged mobile electronic device 400 having a cam mechanism for biasing the motion of the two leaves relative to one another. This embodiment is an example of a device that includes at least one linkage that comprises a channel or passageway through which a flexible printed circuit (FPC), a coaxial cable, a flat ribbon cable, a hookup wire and/or other electrical communication apparatus can be routed between the two leaves.

With reference to FIG. 6A, the device comprises a first leaf 402, a second leaf 404, a first linkage 420, a second linkage 430, a first pusher 440 and a second pusher 450. The second linkage 430 can be significantly thicker than the first linkage 420 such that the second linkage 430 can comprise a channel running longitudinally through that is used to route the FPC 490 from between the first and second leaves 402, 404. In the open position shown in FIG. 6A, the pusher 440 is engaged with the detent 428 and the second pusher 450 is engaged with the detent 438. In the embodiment shown, the linkages 420, 430 are nearly flush, or coplanar, with the inner major surfaces of the leaves, and in other embodiments, the linkages can be completely flush with the inner major surfaces of the leaves, which can provide desirable appearance in the open position.

FIG. 6B shows the device in a closed position and illustrates the relative widths if the two linkages 420, 430. In one example, the second linkage 430 can be about three-times the width of the first linkage 420, such as about 3 mm and 1 mm, respectively.

As can be seen in FIG. 7, while in the closed position, the second linkage 430 comprises an internal channel 492 extending from adjacent pivot axis 432 to adjacent pivot axis 434. The FPC 490 can extend from leaf 402, through channel 492, and to leaf 404. By routing the FPC 490 through the channel 492, the FPC can be protected and the bending of the FPC can be controlled. The channel 492 can be completely enclosed, forming a tunnel-like passageway through the linkage 430, or the channel 492 can be partially open on a side. In the embodiment shown in FIG. 7, the FPC is routed between the pusher 450 and a screen (not shown) in the outer major surface of leaf 402.

FIGS. 8A and 8B shown the how the FPC is routed through the device in the closed and open positions, respectively. In the closed position of FIG. 8A, the FPC can have a slight amount of slack, while in the open position of FIG. 8B, the FPC can have a greater amount of slack. As shown in FIG. 8B, the configuration of the channel 492 through the linkage 430 can help direct the manner in which the FPC bunches and tightens during the repeated opening and closing of the device to protect the FPC from kinking, pinching or other damage, such as from the cam mechanisms.

As noted above, some embodiments of hinged mobile electronic devices comprise two sets of linkages, one set on either side of the device (as is shown in FIG. 1). In some of these embodiments, both of the inner linkages 430 can be wider and/or thicker than the outer linkages 420 (see FIGS. 6A and 6B, for example) and both of the inner linkages 430 can comprise channels 492 (see FIGS. 7-8B, for example) extending longitudinally through them. At least one of the channels 492 can be used to route an FPC and another of the channels 492 can be used to route a second electrical communication apparatus, such as a second FPC or a coaxial cable, such as for an antenna or for transferring power between the leaves.

FIGS. 5-8 show examples of devices comprising radial cam mechanisms. In other word, the pushers move radially with respect to the corresponding cam pivot axes when the device opens and closes. Other embodiments can comprise axial cam mechanisms wherein pusher move axially with respect to the corresponding cam pivot axes when the device opens and closes. One such example is illustrated in FIG. 9. This device comprises a first leaf 502, a second leaf 504, a first linkage 520, a second linkage 530, and pivot axes 524, 522, 532 and 534, similar to the other embodiments described above. In the embodiment shown, as the linkages rotate about the axes 522, 534, detents in cam elements 544, 554, oriented perpendicular to the axes 522, 534, rotate about the axes and cause pushers 540, 550 to slide axially and interact with the axially oriented springs 560, 570. The pushers 540, 550 can comprise a projecting portion 542, 552 that rides up and down as it passes detents and raised portions of the corresponding cam elements 544, 554. The cam elements 544, 554 can comprise a portion of the linkages 520, 530 or can comprise separate axially oriented pin elements that pass through the linkages. The axial cam mechanisms can function similarly to the radial cam mechanisms described above to bias the pivotal motion of the leaves 502, 504.

Figure 5D:
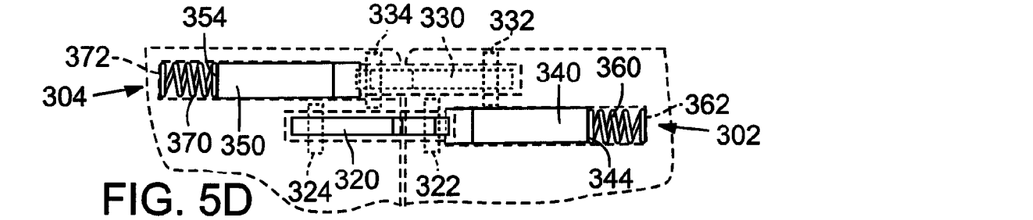
Figure 10:
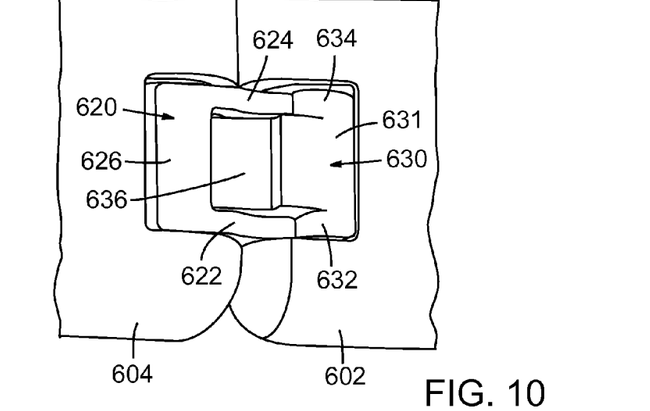
FIG. 10 is a perspective view of a portion of another exemplary hinged mobile electronic device, shown in an open position, having two nested linkages.

FIGS. 10-13 illustrate embodiment of a hinged mobile electronic device having nested linkages, one of which comprises a channel for routing an FPC between the two leaves. FIG. 10 shows the inner side of one nested hinge of the device in an open position. The device can have two or more such hinges, each comprising two nested linkages. As used herein, the term "nested" means that, when the device is in any pivotal position, there exists no plane that separates the entire first linkage from the entire second linkage. By contrast, the linkages 120 and 130 are not nested as they are entirely separated by a plane perpendicular to the pivot axes, as can be seen in FIGS. 2, and 3D. Similarly, the linkages 320 and 330 are not nested, as shown in FIG. 5D, and the linkages 420 and 430 are not nested, as shown in FIG. 6B.

FIG. 10 shows a first leaf 102 coupled to a second leaf 604 with a split linkage 620 and a middle linkage 630. The split linkage can be "U" shaped and comprises a base portion 626 with a first arm 622 and a second arm 624 extending from the base portion. The two arms 622, 624 form a gap between them. The middle linkage 630 can be "H" shaped and comprises a first base portion 631, a second base portion 638 and connecting portions 636, 637 connecting the base portions. The connecting portions 636, 637 pass through the gap between the arms 622, 624 of the split linkage 620.

Figure 11:
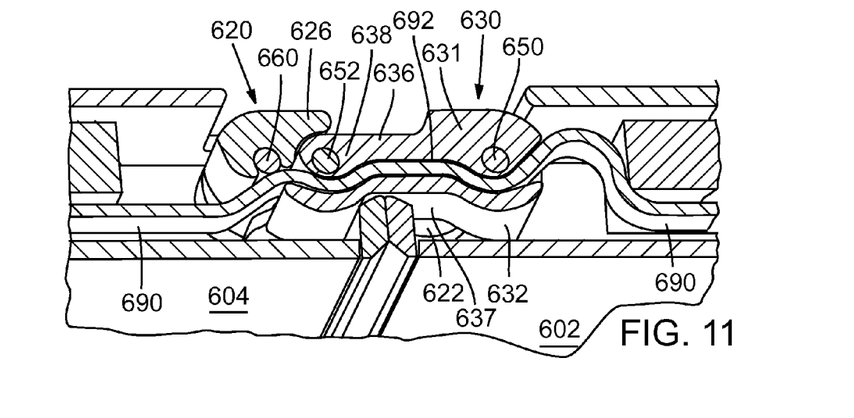
FIG. 11 is a cross-sectional view of the device of FIG. 10 showing the routing of a FPC through the linkages in the open position.
Figure 12:
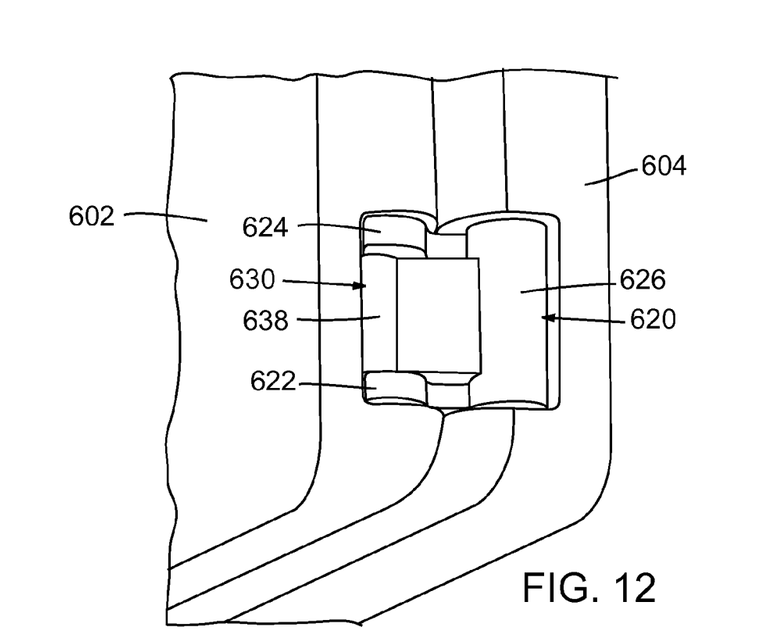
FIG. 12 is a perspective view of the device of FIG. 10, shown in a closed position.
Figure 13:
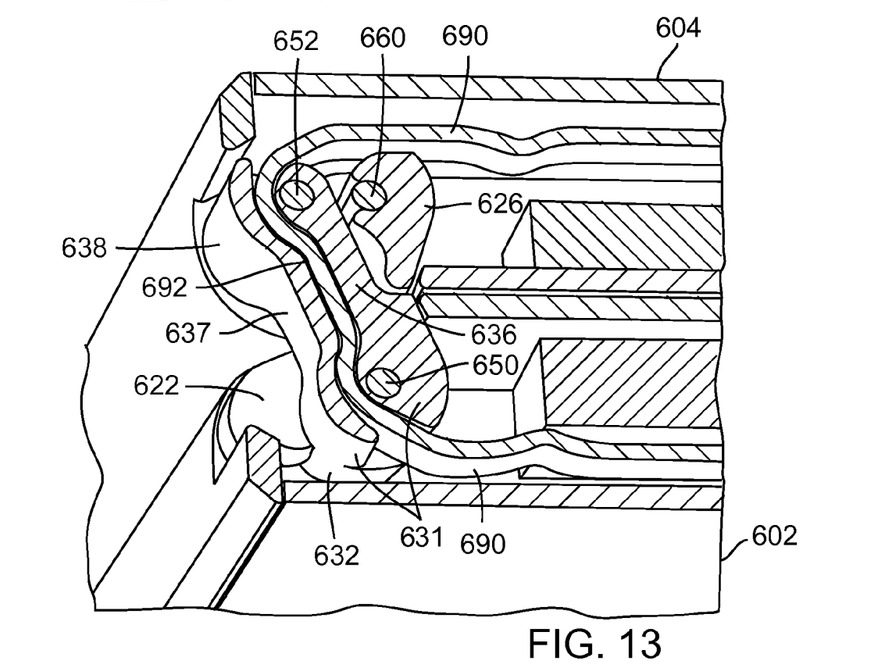
FIG. 13 is a cross-sectional view a portion of the device of FIG. 10 showing the routing of a FPC through the linkages in the closed position.

As shown in FIGS. 11 and 13, the middle link 630 comprises a channel 692 between the connecting portions 636, 637 for routing an FPC 690 between the leaves. The inner connecting portion 636 is visible when the device is in the open position and the outer connecting portion 637 is visible when the device is in the closed position. The channel 692 can be a fully enclosed tunnel-like aperture through the middle linkage 630, or can be partially open on a side.

As shown in FIGS. 11 and 13, the device can comprise four parallel pivot axes, similar to the embodiments described above. Pivot axis 650 can pivotally couple the middle linkage to the first leaf 602 and pivot axis 652 can pivotally couple the middle linkage to the second linkage. Axis 650 can pass through the first base portion 631 of the middle linkage 630, extending from end portion 632 to 634. Axis 652 can similarly pass through the second base portion 638 of the middle linkage.

Pivot axes 660 and 662 can pivotally couple the split linkage 620 to the first and second leaves 602, 604, respectively. Axis 660 can pass through the base portion 626 of the split linkage and axis 662 can pass through each of the arms 622 and 624.

Like the devices shown in FIGS. 5-8, devices comprising nested hinges can also comprise biasing mechanisms for biasing the pivotal motion of the leaves as the device opens and closes. Such biasing mechanisms can include axial and/or radial cam mechanisms as described above, or other suitable biasing mechanisms.

Figures 14, 15, 16:
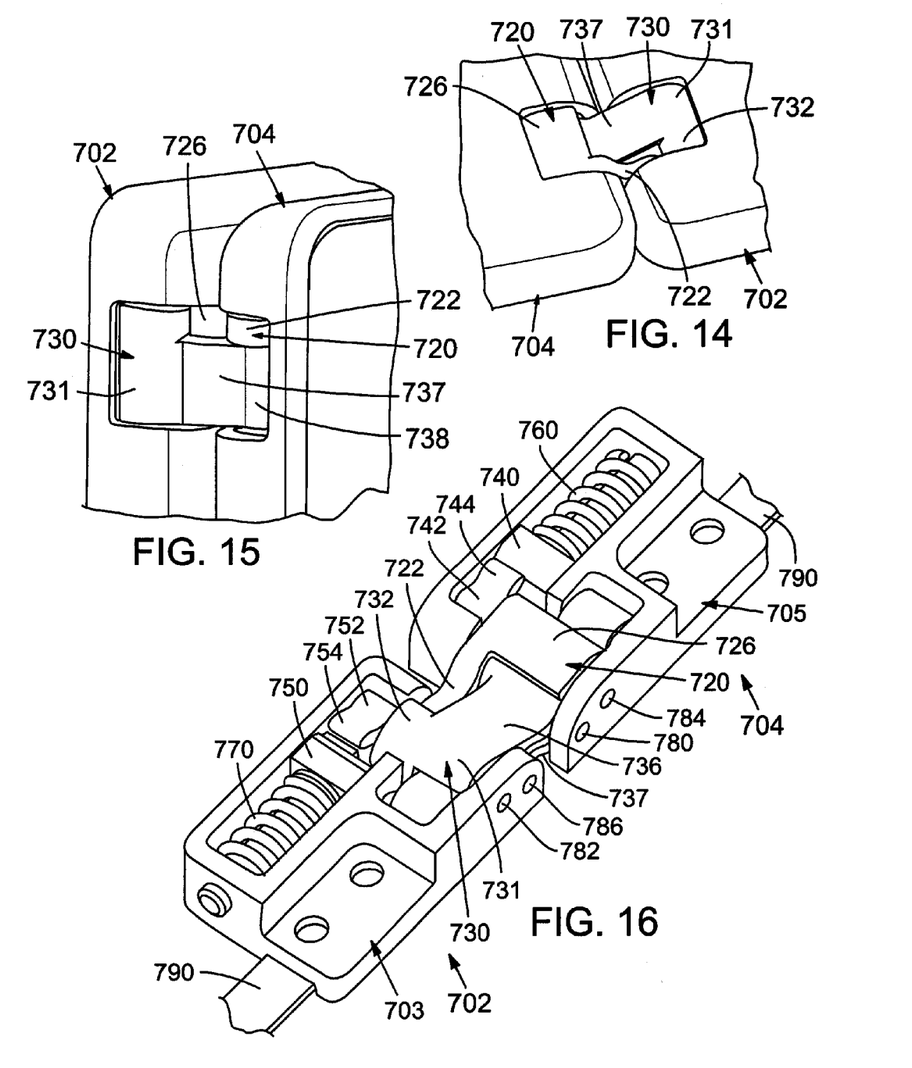
FIG. 14 is a perspective view of an inside portion of yet another exemplary hinged mobile electronic device, shown in an open position, having two nested linkages.
FIG. 15 is a perspective view an outside portion of the device of FIG. 14, shown in a closed position.
FIG. 16 is a perspective view of a portion of the device of FIG. 14, shown from the inside in an open position.

FIGS. 14-18 illustrate another embodiment of a hinged mobile electronic device having nested linkages, one of which comprises a channel for routing an FPC between the two leaves. FIG. 14 shows an inside view of an exemplary pair of nested linkages in an open position and FIG. 15 shows an outside view in a closed position.

The pair of linkages comprises a first linkage 720 and a second linkage 730 that both pivotally couple a first leaf 702 to a second leaf 704. The first linkage 720 comprises a base portion 726 coupled to the second leaf 704 at pivot axis 784 and an intermediate, or arm, portion 722 coupled to the first leaf 702 at pivot axis 786. The second linkage 730 comprises a first base portion 731 coupled to the first leaf 702 at pivot axis 782, a second base portion 738 coupled to the second leaf 704 at pivot axis 780, and an intermediate, or bridge, portion 736 connecting the first and second base portions 731, 738. The bridge portion 736 comprises an outer flange 737 that forms a channel 792 extending longitudinally through the second linkage 730, through which an FPC 790 can be routed.

As shown in FIG. 16, the first leaf 702 can comprise a first chassis 703 and the second leaf 704 can comprise a second chassis 705. The chassis 703 and 705 can comprise a framework structure to support the linkages 720, 730, pushers 740, 750, springs 760, 770 and the FPC 790. Pins can be used to pivotally couple the linkages to the chassis at the four pivot axes. Such pivot pins can be fixed to the chassis and allow the linkages to pivot about the pivot pins. In some embodiments, one or more pivot pins can be threaded to mate with one or more portions of the linkages or chassis.

The first linkage 720 can further comprise a member 742 that extends along the pivot axis 784 from the base portion 726. Similarly, the second linkage 730 can further comprise a member 752 that extends along the pivot axis 782 from the base portion 731. Members 742,752 can be couple to the respective linkages 720, 730 such that the members rotate in unison with respective linkages. The members 742, 752 comprise respective cam portions 744, 754 that interact with respective pushers 740, 750 and springs 760, 770 as the linkages rotate relative to the chassis to bias the pivotal motion of the between the first leaf and the second leaf.

Figure 17:
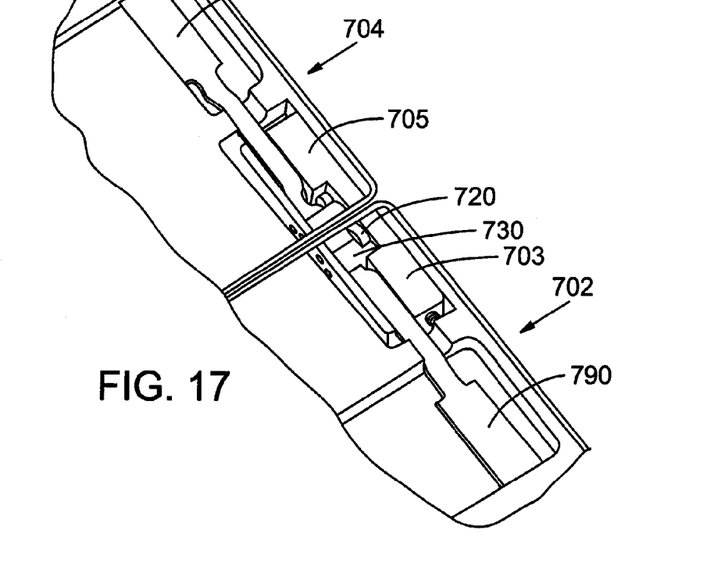
FIG. 17 is a perspective view of a portion of the device of FIG. 14, showing the routing of an FPC through the linkages and the chassis in an open position.

FIG. 17 shows an outside view of the device in the open position, with the outer surfaces of the leaves removed. Each leaf contains one of the chassis 703, 705 with the nested linkages 720, 730 interconnecting the two leaves via the two chassis. The FPC 790 can have a broad portion on each end where it connects to each of the leaves and an intermediate portion that runs over the chassis and through the channel 792 in the linkage 730, as shown in FIG. 19.

Figure 18:
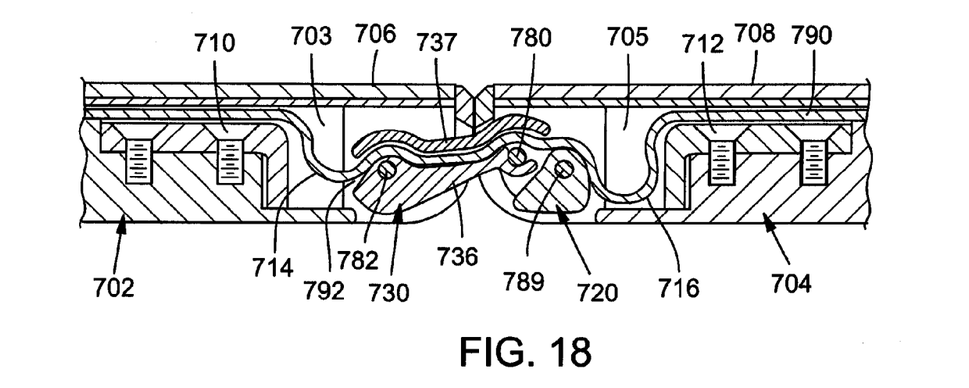
FIG. 18 is a cross-sectional view of the device of FIG. 14 showing the routing of an FPC through the linkages and the chassis in an open position.

FIG. 18 shows a sectional view of the device in the open position with the outer displays 706 and 708 on the upper surfaces of the device, the chassis 703 and the leaf 702 on the left and the chassis 705 and the leaf 704 on the right. The FPC can be bonded to the leaves or to the chassis 703, 705 near fasteners 710 and 712, respectively, or at other locations farther from the linkages 720, 730. An appropriate amount of slack can be formed in the FPC 790 between the bonding locations on each leaf such that, when the device is in the closed position, such as shown in FIG. 15, at least some small amount of slack still remains in the FPC between the bonding points. It can be desirable to not apply tension on the FPC at any position to avoid damage. The amount of slack in the FPC, however, can be minimized to reduce the size of the service loops 714, 716 to avoid excessive bunching, kinking, or other damage to the FPC resulting from too much slack. As shown in FIG. 18, space can be provided in the chassis to accommodate the service loops 714, 716 at their maximum size when in the open position, and the channel 792 in the linkage 730 and the base portion 726 (see FIG. 16) of the linkage 720 can be shaped to guide the movement of the FPC between the open and closed positions of the device to cause the FPC to flex in the same manner each time the device is opened or closed.

Many embodiments described herein share several desirable features. First, the devices have stationary pivots and open and close in a determinate motion. Second, the devices open to a flat position with the two leaves side-by-side with no protrusions above the inner major surfaces. Third, the devices are durable enough to withstand at least 100,000 open/close cycles without significant damage. Fourth, the linkages provide a protected routing of electrical interconnect apparatus between the two leaves. Fifth, the devices maximize space on the major surfaces of the leaves for the display screens and/or key pads. Sixth, the devices allow for the screens/key pads on opposite leaves to come as close together as possible in the open position. And seventh, the devices include a mechanism for biasing the pivotal motion of the leaves.

In view of the many possible embodiments to which the disclosed principles may be applied, it should be recognized that the illustrated embodiments are only preferred examples and should not be taken as limiting the scope of protection. Rather, the scope of protection is defined by the following claims. We therefore claim all that comes within the scope and spirit of these claims.

I claim:

1. A hinge mechanism for a mobile electronic device, comprising:
    a first leaf comprising a first pivot axis and a second pivot axis, the first and second pivot axes being spaced from one another and fixed relative to the first leaf;
    a second leaf comprising a third pivot axis and a fourth pivot axis, the third and fourth pivot axes being spaced from one another and fixed relative to the second leaf, the first, second, third and fourth pivot axes being substantially parallel to one another;
    a first linkage pivotally coupled to the first leaf such that the first linkage is pivotable about the first pivot axis relative to the first leaf, and pivotally coupled to the second leaf such that the first linkage is pivotable about the fourth pivot axis relative to the second leaf; and
    a second linkage pivotally coupled to the first leaf such that the second linkage is pivotable about the second pivot axis relative to the first leaf, and pivotally coupled to the second leaf such that the second linkage is pivotable about the third pivot axis relative to the second leaf;
    wherein the first leaf and the second leaf are pivotable, between a closed position and an open position, at least about 180° relative to one another in a plane substantially perpendicular to the first, second, third and fourth pivot axes; and
    wherein, when the hinge mechanism is in the closed position, the first linkage and the second linkage are transverse to one another when viewed in an axial direction of the first, second, third and fourth pivot axes;
    wherein the first leaf and the second leaf are pivotable, between a fully closed position and an open position, wherein the first and second leaves extend in opposite directions from each other in the open position, and wherein the first leaf pivots about 180° relative to the second leaf between the closed and open positions; and
    wherein, when the mobile device is in the open position, the distance between the first pivot axis and the third pivot axis is substantially different than the distance between the second pivot axis and the fourth pivot axis.

2. The hinge mechanism of claim 1, wherein, when the hinge is in the open position, the first linkage and the second linkage are substantially parallel to one another when viewed in an axial direction of the first, second, third and fourth pivot axes.

3. The hinge mechanism of claim 1, wherein only substantially determinate motion is permitted as the first and second leaves pivot between the closed position and the open position.

4. The hinge mechanism of claim 1, further comprising:
    a third linkage pivotally coupled to the first leaf such that the third linkage is pivotable about the first pivot axis relative to the first leaf, and pivotally coupled to the second leaf such that the third linkage is pivotable about the fourth pivot axis relative to the second leaf, the first and third linkages being positioned on opposite sides of the second linkage; and
    a fourth linkage pivotally coupled to the first leaf such that the fourth linkage is pivotable about the second pivot axis relative to the first leaf, and pivotally coupled to the second leaf such that the fourth linkage is pivotable about the third pivot axis relative to the second leaf, the second and fourth linkages being positioned between the first and third linkages.

5. The hinge mechanism of claim 1, wherein an intermediate portion of the second linkage is wider than an intermediate portion of the first linkage in the direction of the second and third pivot axes, the second linkage comprising a longitudinal passage extending through the intermediate portion of the second linkage from adjacent the second pivot axis to adjacent the third pivot axis, the longitudinal passage being configured to route a flexible electrical connector between the first and second leaves.

6. The hinge mechanism of claim 1, further comprising at least one cam mechanism for biasing the pivotal movement of first and second leaves relative to one another, the cam mechanism comprising a radial bistable over-center cam, a radial friction detent cam, an axial bistable over-center cam, or an axial friction detent cam.

7. The hinge mechanism of claim 6, the hinge mechanism further comprising:
   a spring comprising first end portion and a second end portion, the first end portion being engaged with the first leaf; and
   a pusher comprising a first end portion and a second end portion, the first end portion of the pusher being engaged with the second end portion of the spring and slidable relative to the first leaf;
   wherein one of the first and second linkages comprises a cam portion adjacent to the first leaf, the cam portion interacting with the second end portion of the pusher to bias hinge toward the closed position or toward the open position.

8. The hinge mechanism of claim 1, wherein the first and second linkages are nested with one another.

9. The hinge mechanism of claim 1, wherein:
   the first leaf comprises an outer major surface and an inner major surface;
   the second leaf comprises an outer major surface and an inner major surface;
   the inner major surfaces of the first and second leaves are substantially coplanar when the first and second leaves are in the open position;
   the outer major surfaces of the first and second leaves are substantially coplanar when the first and second leaves are in the open position; and
   the first and second pivot axes are about halfway between the inner and outer major surfaces of the first leaf and the third and fourth pivot axes are about halfway between the inner and outer major surfaces of the second leaf.

10. A hinged mobile electronic device, comprising:
    a first leaf comprising a first pivot axis and a second pivot axis, the first and second pivot axes being spaced from one another and fixed relative to the first leaf;
    a second leaf comprising a third pivot axis and a fourth pivot axis, the third and fourth pivot axes being spaced from one another and fixed relative to the second leaf, the first, second, third and fourth pivot axes being substantially parallel to one another;
    a first linkage pivotally coupled to the first leaf such that the first linkage is pivotable about the first pivot axis relative to the first leaf, and pivotally coupled to the second leaf such that the first linkage is pivotable about the fourth pivot axis relative to the second leaf; and
    a second linkage pivotally coupled to the first leaf such that the second linkage is pivotable about the second pivot axis relative to the first leaf, and pivotally coupled to the second leaf such that the second linkage is pivotable about the third pivot axis relative to the second leaf;
    wherein at least one of the first leaf and the second leaf comprises electronic user interface apparatus;
    wherein the first leaf and the second leaf are pivotable, between a fully closed position and an open position, wherein the first and second leaves extend in opposite directions from each other in the open position, and wherein the first leaf pivots about 180° relative to the second leaf between the closed and open positions; and
    wherein, when the mobile device is in the open position, the distance between the first pivot axis and the third pivot axis is substantially different than the distance between the second pivot axis and the fourth pivot axis
    wherein the second linkage comprises a longitudinal passage extending from adjacent the second pivot axis to adjacent the third pivot axis, the mobile device further comprising a flexible printed circuit (FPC) extending between the first leaf and the second leaf, the FPC passing through the longitudinal passage in the second linkage.

11. The mobile device of claim 10, wherein:
    the first leaf comprises a first major surface and an opposed second major surface;
    the second leaf comprises third major surface and an opposed fourth major surface; and
    the first, second, third and fourth major surfaces each comprise an electronic display screen.

* * * * *